United States Patent
Loretz et al.

(10) Patent No.: US 8,322,447 B2
(45) Date of Patent: Dec. 4, 2012

(54) GENERATING POWER IN A WELL

(75) Inventors: Ives D. Loretz, Houston, TX (US); Gary L. Rytlewski, League City, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 366 days.

(21) Appl. No.: 12/651,317

(22) Filed: Dec. 31, 2009

(65) Prior Publication Data
US 2011/0155393 A1    Jun. 30, 2011

(51) Int. Cl.
  E21B 34/10    (2006.01)
  E21B 23/10    (2006.01)
  E21B 43/00    (2006.01)

(52) U.S. Cl. .......... 166/374; 166/65.1; 166/154

(58) Field of Classification Search .......... 166/374, 166/154, 285, 65.1, 319; 340/854.3; 290/52; 322/59; 310/14, 15, 23, 34; 137/596, 625.18, 137/625.19, 625.43
See application file for complete search history.

(56) References Cited

U.S. PATENT DOCUMENTS

| | | | |
|---|---|---|---|
| 5,101,907 A * | 4/1992 | Schultz et al. | 166/386 |
| 5,149,984 A * | 9/1992 | Schultz et al. | 290/54 |
| 5,197,514 A * | 3/1993 | Jaun | 137/597 |
| 5,839,508 A * | 11/1998 | Tubel et al. | 166/65.1 |
| 5,965,964 A * | 10/1999 | Skinner et al. | 310/15 |
| 6,011,346 A | 1/2000 | Buchanan | |
| 6,504,258 B2 | 1/2003 | Schultz | |
| 6,717,283 B2 | 4/2004 | Skinner | |
| 6,845,819 B2 | 1/2005 | Barrett | |
| 7,242,103 B2 | 7/2007 | Tips | |
| 7,560,856 B2 | 7/2009 | Chen | |
| 7,617,891 B2 | 11/2009 | Chan | |
| 7,692,320 B2 * | 4/2010 | Lemieux | 290/1 R |
| 2007/0114066 A1 * | 5/2007 | Hall et al. | 175/61 |
| 2007/0194947 A1 * | 8/2007 | Huang et al. | 340/854.3 |
| 2009/0134631 A1 | 5/2009 | Guerrero | |
| 2009/0140604 A1 | 6/2009 | Cjhen | |
| 2011/0148656 A1 * | 6/2011 | Hudson et al. | 340/854.3 |

FOREIGN PATENT DOCUMENTS

WO    2009156734    12/2009

\* cited by examiner

*Primary Examiner* — Daniel P Stephenson
*Assistant Examiner* — Michael Wills, III
(74) *Attorney, Agent, or Firm* — Brandon S. Clark; Rodney V. Warfford

(57) ABSTRACT

An apparatus that is usable with a well includes an operator and a generator. The operator is disposed in the well and configured to respond to a differential pressure between hydraulically isolated zones of the well to produce mechanical motion. The generator is disposed in the well to convert the mechanical motion into electricity. A method that is usable with a well is provided including maintaining hydraulic isolation between a first and second zone of a well. While maintaining the hydraulic isolation, the method further includes producing a mechanical motion in response to a differential pressure between the first and second zones and generating electricity in response to the mechanical motion.

18 Claims, 3 Drawing Sheets

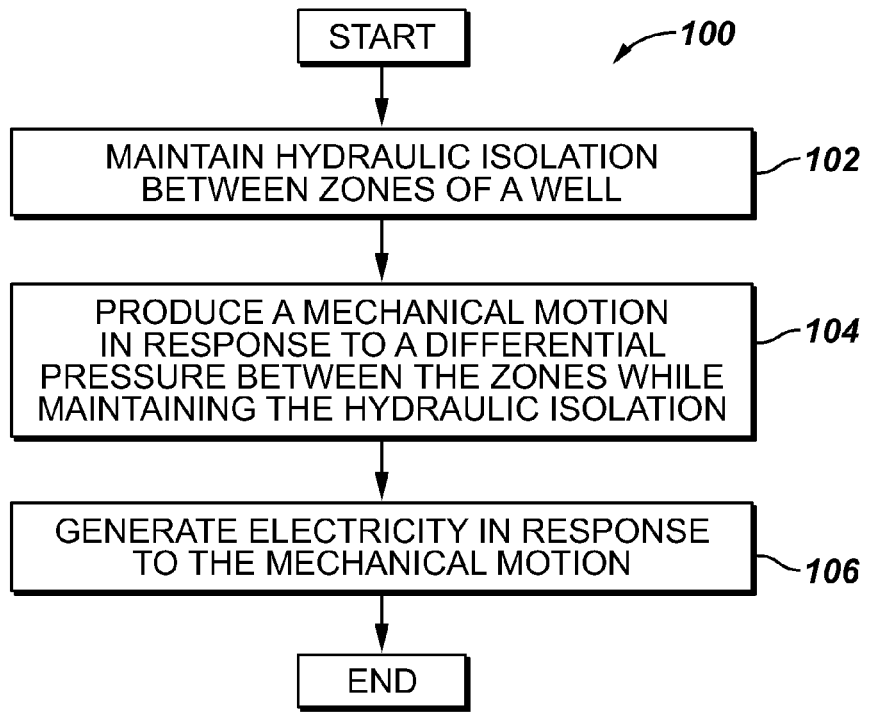
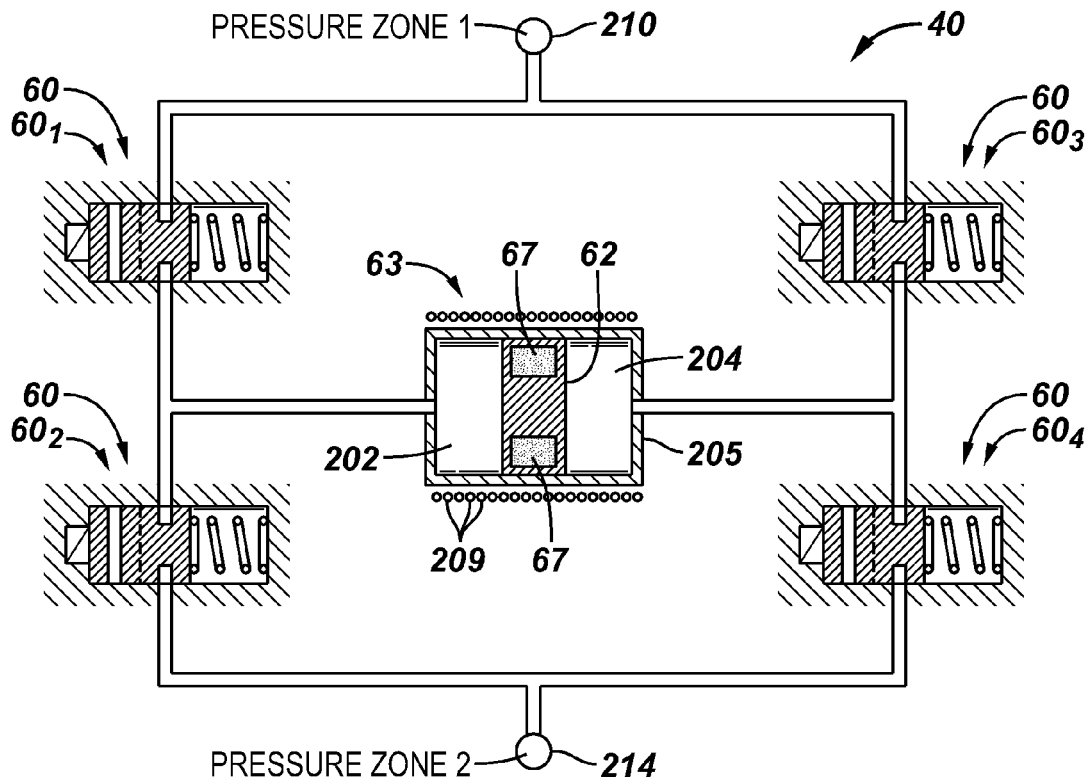

GENERATING POWER IN A WELL

BACKGROUND

The invention generally relates to generating electrical power in a well.

One of the primary challenges in intelligent well completions is the reliable delivery of power to downhole electronics, such as the electronic components of valves, sensors, telemetry modules, etc. One conventional solution involves the use of permanent cables to establish hard wired connections between the downhole electronics and power supplies that are typically located at the surface of the well.

Alternatively, other electronic systems have been proposed, such as the use of wireless devices. There are advantages to using wireless devices in a well. However, in order for a device to be truly wireless, its power supply must be localized. In other words, the power supply for the wireless device must be located downhole either in proximity to or incorporated in the device. One way to provide power to a downhole, power consuming wireless device is to dispose a stored energy source, such as a battery, in or near the device. However, challenges associated with battery technology limit how much energy may be stored. In addition, the battery may have a relatively short expected lifetime, as compared to the expected lifetime of the wireless device and other downhole components, necessitating costly interventions or other replacement operations.

Thus, there exists a continuing need for better ways to supply power to downhole components in a well, although embodiments of the invention may not be limited to satisfying this exemplary need.

SUMMARY

In an embodiment of the invention, an apparatus that is usable with a well includes an operator and a generator. The operator is disposed in the well to respond to a differential pressure between hydraulically isolated zones of the well to produce mechanical motion. The generator is disposed in the well to convert the mechanical motion of the operator into electricity.

In another embodiment of the invention, a technique that is usable with a well includes maintaining hydraulic isolation between zones of a well and while maintaining the hydraulic isolation, producing a mechanical motion in response to a differential pressure between the zones. The technique includes generating electricity in response to the produced mechanical motion.

Advantages and other features of the invention will become apparent from the following drawing, description and claims.

BRIEF DESCRIPTION OF THE DRAWING

Certain embodiments of the invention will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows:

FIG. 2 is a flow diagram depicting a technique to generate electrical power downhole in a well according to an example;

FIGS. 3 and 4 are schematic diagrams illustrating downhole power generation systems according to different examples;

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

In accordance with systems and techniques that are described herein, electrical power is harvested downhole in a well using a pressure differential that exists between two hydraulically isolated zones. As non-limiting examples, the zones may be a first zone located on the inside of a production tubing string and a second zone located on the outside of the production tubing string; the zones may be disposed on opposite sides of a packer; etc. As described below, a power generation system may include a mechanical operator that is driven in response to the pressure differential, and a generator of the system that generates electrical power in response to the mechanical motion of the operator.

The power generation that is described herein may have one or more of the following advantages. The power generation may be controllable such that the power generation system may be completely stopped if power generation needs to be halted. Unlike turbines, the systems and techniques that are disclosed herein do not require a continuous fluid flow (i.e., which is not possible in a suspended or shut in well for example). Instead, the cycling frequency of the mechanical operator may be controlled for purposes of optimizing both the efficiency and the overall performance of the power generation system. Other and different advantages may be achieved in accordance with other examples.

Turning now to a more specific example, a well 10 (see FIG. 1) in accordance with an example includes a wellbore 20 that extends through one or more producing formations. The wellbore 20 may or may not be cased, and as such, the wellbore 20 may or may not be lined with a casing string 22 that supports the wellbore wall. Although a vertical wellbore is depicted in FIG. 1, it is understood that the wellbore may alternatively be a lateral or highly deviated wellbore, as the techniques and systems that are disclosed herein may be used in variety of different types of applications and wellbores.

Figure 1:
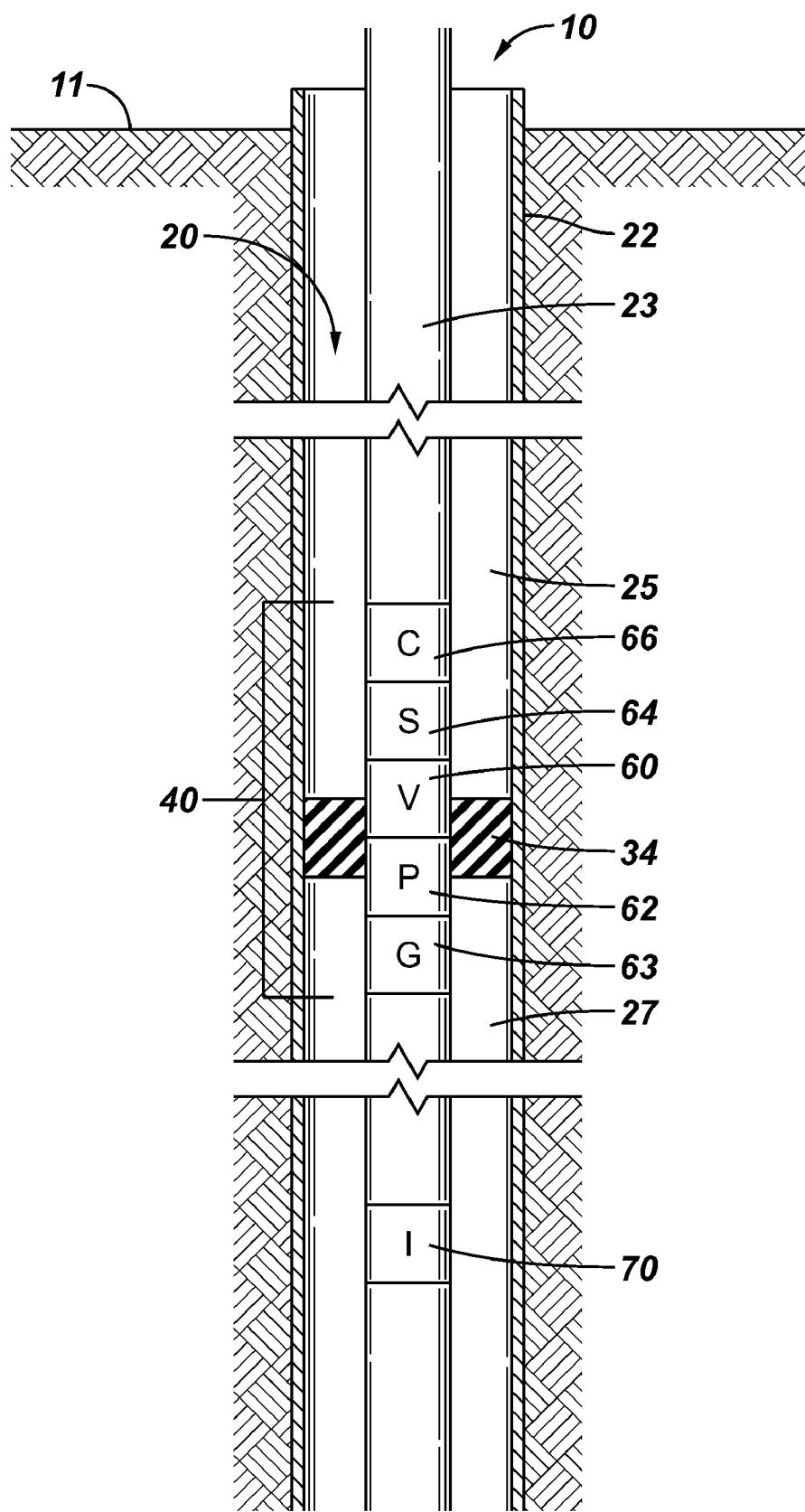
FIG. 1 is a schematic diagram of a well according to an example.

As depicted in FIG. 1, a tubing string 23 (e.g., such as a production tubing string, for example) extends downhole into the wellbore 20 and includes at least one tool 70 configured for the purposes of performing a downhole function. As non-limiting examples, the tool 70 may be a flow control valve, inflow control valve, formation isolation valve, sampling device, a wireless telemetry unit, or a sensor. Regardless of its function, the tool 70 consumes electrical power and this power is provided by a downhole power generation system 40 that is located in close proximity to the tool 70. Depending on the particular implementation, the power generation system 40 may or may not be a modular sub that is constructed to be installed and removed from the tubing string 23 as a unit.

The power generation system 40 harvests power from a pressure differential that exists between two hydraulically separated zones of the well 10. As non-limiting examples, these zones may be zones 25 and 27 that are located on opposite sides of a packer 34 of the tubing string 23. However, the pressure differential may be derived from other hydraulically isolated zones, such as a first zone inside of the tubing string 23 and a second zone outside of the tubing string 23.

Regardless of the source of the pressure differential, the power generation system 40 is configured to respond to the pressure differential by generating a mechanical motion, which a generator 63 of the system 40 converts into electrical power. As a non-limiting example, the generator 63 may generate its electrical power as a result of electrical induction that is caused by relative motion in a magnetic field. As described further below, the relative motion in the magnetic field may be generated by movement of a mechanical operator of the power generation system 40.

More specifically, as a non-limiting example, in some implementations, the mechanical operator is a piston 62 that mechanically translates in response to alternating pressures that are applied on opposite sides of the piston 62 due to the operation of valves 60. Although both sides of the piston 62 are exposed to the isolated zones in an alternating fashion, the piston 62 maintains the hydraulic isolation between the zones.

Among its other features, in accordance with some implementations, the power generation system 40 may include a controller 66 to regulate the overall generation of power produced by the power generation system 40. In this regard, some or all aspects of how the controller 66 regulates the power generation may be, for example, remotely controlled (e.g., such as wirelessly controlled through remote stimuli such as pressure pulses, acoustic waves, electromagnetic (EM) waves, etc.) from the surface or other locations of the well 10. In other arrangements, the controller 66 may independently and autonomously control aspects of the power generation based on feedback of voltages and/or currents that are the result of the power generation, sensed downhole conditions, feedback from the individual power consuming devices, the overall power being demanded by the power consuming loads, etc. As non-limiting examples, the controller 66 may include a microcontroller and/or microprocessor that executes software instructions to perform some of the above-described functions and/or the controller 66 may include hardwired circuitry configured to perform at least some of these functions.

In general, the controller 66 may be designed to regulate the operation of the valves 60 for purposes of controlling the cycling frequency of the piston 62. Depending on the implementation, the controller 66 may, based on sensed feedback from the power generation system 40, feedback from the well surface, or feedback from the power consuming devices, change the operating frequency of the piston 62 in order to optimize the power generation system's 40 overall performance, control the charging and draining modes of power storage devices 64, as well as provide health monitoring of the various system components. The controller 66 may also be in communication with the surface of the well via wired or wireless telemetry for purposes of receiving commands and other information, such as a command to change the operating frequency, a command to start up power generation, a command to shut down power generation, a status inquiry, etc. Furthermore, the controller 66 may control power conditioning circuitry (not depicted in FIG. 1), which receives the electrical output of the generator 63 and converts the output into a proper AC or DC form required by the corresponding power consuming loads, such as the tool 70.

The power generation system 40 may further include other features such as electrical storage 64. As a non-limiting example, the electrical storage 64 may include one or more batteries, capacitors, etc., for such purposes as storing excess energy that is produced by the power generation system 40, regulating the output of the power generation system 40, and stabilizing the delivery of the power to the downhole power consuming loads. The electrical storage 64 may also provide electrical power to power consuming components of the power generation system 40, such as the controller 66 and valves 60, as non-limiting examples.

It is noted that FIG. 1 depicts merely an illustrative example of one out of many possible implementations of the power generation system 40, as one of skill in the art would appreciate numerous variations from the exemplary power generation system 40, such as implementations in which the power generation system 40 is a standalone unit that is not part of a tubular string; inclusion of the power generation system 40 in a side pocket of a string; incorporation of the power generation system 40 directly into a particular downhole tool; etc. Thus, many variations are contemplated and are within the scope of the appended claims.

Referring to the exemplary flowchart depicted in FIG. 2, a technique 100 may be used for purposes of generating downhole power. In summary, hydraulic isolation is maintained between zones of a well, pursuant to block 102, and mechanical motion is produced in response to the differential pressure while the hydraulic isolation is maintained, according to block 104. Electricity is generated, pursuant to block 106, in response to the mechanical motion.

In accordance with some implementations, the power generation system 40 may, in general, have a design that is depicted in FIG. 3. Referring to FIG. 3 in conjunction with FIG. 1, in this implementation, the power generation system 40 includes four solenoid valves 60 (solenoid valves $60_1$, $60_2$, $60_3$ and $60_4$, specifically), which control the application of pressure to the piston 62 for purposes of cycling the piston 62. More specifically, for the implementation that is depicted in FIG. 3, the pressures used to drive the pistons 62 are derived from pressure zones 210 and 214. The piston 62 is disposed in a piston chamber 205 such that a first variable volume chamber 202 is created on one side of the piston 62 and a second variable volume chamber 204 is created on the other side of the piston 62. It is noted that the piston 62 and chamber 205 are depicted in schematic form in FIG. 3 and the proceeding figures, as one of skill in the art would recognize that the piston 62 and piston chamber 205 may actually be annular in design, with the central passageway of the tubing string 23 extending there through.

For the illustrative example depicted in FIG. 3, the generator 63 is formed from a combination of magnets 67 that are embedded in the piston 62 and a corresponding coil 209 that extends around the chamber 205. Due to this arrangement, movement of the piston 62 (i.e., and related movement of the magnets 67) induces a corresponding electrical voltage on the coil 209. The voltage may possibly be conditioned (converted into DC, changed in frequency, converted to a different AC voltage, etc.) by circuitry (not shown) of the power generation system 40 before being used to charge the electrical storage 64 (FIG. 1) or being furnished to an electrical load.

The valves 60 apply the differential pressure between the pressure zones 210 and 214 across the piston 62 in an alternating fashion to drive the piston 62 in a cycle. More specifically, for the implementation that is depicted in FIG. 3, the valves $60_1$ and $60_3$ facilitate the application of pressure from pressure zone 210 to the respective chambers 202 and 204;

and the valves $60_2$ and $60_4$ facilitate the application of pressure from pressure zone 214 to the respective chambers 202 and 204.

As an example, for a particular half cycle, the controller 66 may operate the valves 60 in the following manner. It is noted that for the exemplary valves depicted in FIG. 3, each valve 60 may be normally configured as closed, and in this non-actuated state, the valve 60 does not couple the associated pressure zone to the associated chamber. Referring to FIG. 1 in conjunction with FIG. 3, in order to drive the piston 62 from left to right (for the orientation depicted in FIG. 3), the controller 66 actuates valve $60_1$ to couple the pressure zone 210 and chamber 202, and valve $60_4$ to communicate pressure from the pressure zone 214 to chamber 204. In some cases, the controller may simultaneously actuate two or more valves 60, in other cases, the valves 60 may be actuated individually in order to reduce the peak electrical load of the power generation system 40. Furthermore, for the examples that are described herein, it is assumed that the pressure of the pressure zone 210 exceeds the pressure of the pressure zone 214, and the differential is enough to overcome any frictional, inertial, or other forces that would otherwise prevent or inhibit the piston 62 from translating relative to the coil 209. Therefore, during one half cycle, the piston 62 moves left to right as the volume of chamber 204 is reduced and the volume of the chamber 202 is increased.

For a subsequent half cycle, the controller 66 ceases actuation of the valves $60_1$ and $60_4$ and actuates the valves $60_2$ and $60_3$ either individually or simultaneously. Due to the actuation by the controller 66, the valve $60_2$ communicates pressure from the pressure zone 214 to the chamber 202, and the valve $60_3$ communicates pressure from the pressure zone 210 to the chamber 204. In response to these applied pressures, the piston 62 travels in the opposite direction (from right to left as seen in FIG. 3), thereby reducing the volume of the chamber 202 and increasing volume of the chamber 204. The above-described process repeats by alternating actuation of the set of valves $60_1$ and $60_4$ with the set of valves $60_2$ and $60_3$ to cycle the piston 62. This cycling, in turn, causes the coil 209 to move through the magnetic fields of the magnets 67, thereby inducing a voltage on the coil 209 and generating electricity.

Figure 4:
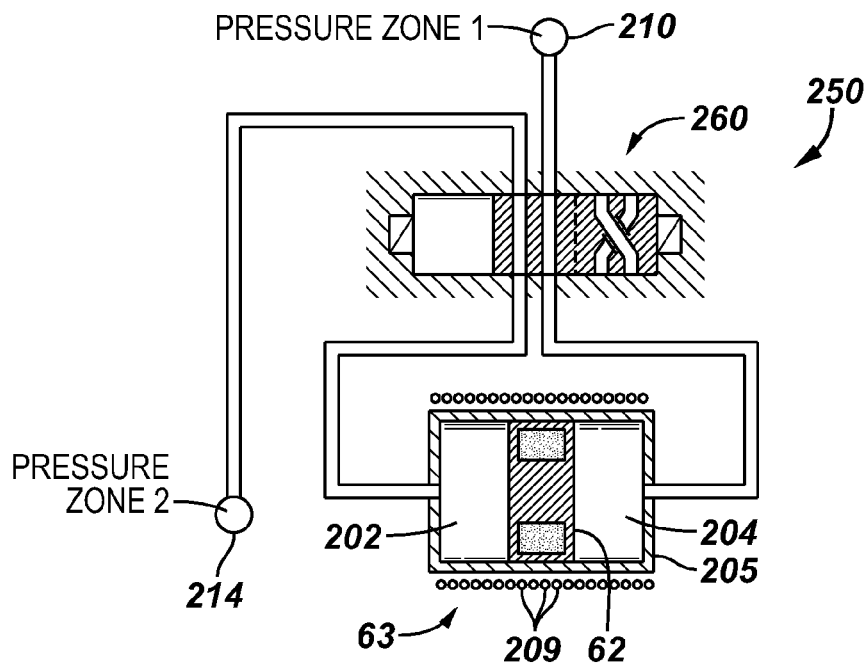

It is noted that the implementation that is depicted in FIG. 3 is one out of many possible implementations, as can be appreciated by one of skill in the art. For example, in accordance with some implementations, the power generation system 40 that is depicted in FIG. 3 may be replaced by a power generation system 250 that is depicted in FIG. 4. The power generation system 250 replaces the four solenoid valves 60 of FIG. 3 with a single four-way, two-position hydraulic control valve 260. The hydraulic control valve 260 may still be controlled by a controller 66 (see FIG. 1).

In general, the valve 260 has two states: a first state (as shown in FIG. 4) in which the valve 260 facilitates communication of fluid pressure between the pressure zone 214 and the chamber 202 and communication of fluid pressure between the pressure zone 210 and the chamber 204; and a second state in which the valve 260 facilitates communication of pressure between the pressure zone 210 and the chamber 202 and communication of pressure between the pressure zone 214 and the chamber 204. Thus, the valve 260 is in one particular state for a given half cycle, and then switched to the other state for the next half cycle.

For purposes of increasing the reliability of the power generation system, in accordance with some implementations, the control valve as well as the power generation piston may be designed to be debris tolerant and exhibit minimal wear. In order to accomplish this, the piston assembly may include a bellows system or debris-tolerant dynamic seals for example. As a further example, the hydraulic control valve may include shear seals, such as in the illustrative implementation depicted in FIG. 5.

Figure 5:
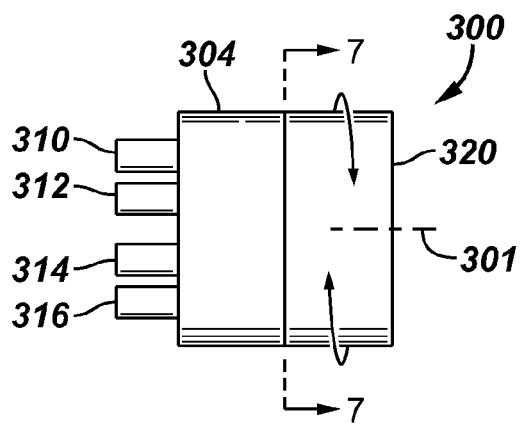
FIG. 5 is a front view of a valve of a power generation system according to an example.
Figure 6:
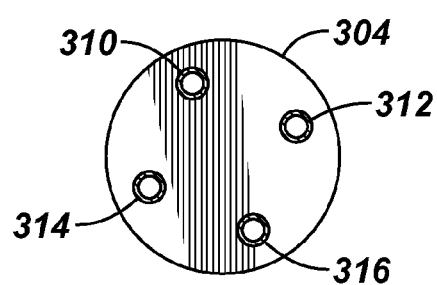
FIG. 6 is a side view of the valve of FIG. 5 according to an example.

Referring to FIG. 5, in some cases a four-way, two-position hydraulic control valve 300 may be used in place of the valve 260 of the embodiment shown in FIG. 4. The valve 300 may include a stationary manifold plate 304 and a distribution plate 320 that rotates relative to the manifold plate 304 about an axis 301. Referring to FIG. 6 along with FIG. 5, the manifold plate 304 includes four ports 310, 312, 314 and 316, which may be respectively connected to pressure zone 210, chamber 202, chamber 204 and pressure zone 214, in this example. Further referencing FIG. 7 in conjunction with FIGS. 5 and 6, rotation of the distribution plate 320 about the axis 301 alternately connects the pressure zones 210 and 214 with the chambers 202 and 204 on either side of the piston 62 (see FIG. 4). In this regard, the distribution plate 320 may have passageways such as arcuate channels 330 and 332, each of which may connect a particular chamber 202, 204 and a particular pressure zone 210, 214, depending on the angular orientation of the plate 320.

Figure 7:
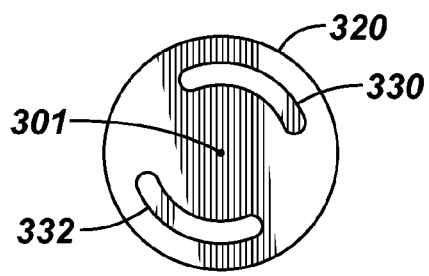
FIG. 7 is a cross-sectional view taken along line 7-7 of FIG. 5 according to an example.

More particularly, for the exemplary orientation of the distribution plate 320 shown in FIG. 7, the channel 330 establishes fluid communication between the pressure zone 210 and the chamber 202, and the channel 332 establishes fluid communication between the pressure zone 214 and the chamber 204. Rotation of the distribution plate 320 through 90° (e.g., in a clockwise direction for example) changes the connections so that the channel 330 establishes fluid communication between the pressure zone 214 and chamber 202, and the chamber 332 establishes fluid communication between the pressure zone 210 and the chamber 204. Thus, the connections alternate for each quarter turn of the distribution plate 320.

It is noted that rotation of the distribution plate 320 may be accomplished in many different ways. As a non-limiting example, in some cases the distribution plate 320 may be turned by an electric motor (not shown) that is controlled by the controller 66. The electric motor may receive power from the stored energy source 64. In such a situation, the rotational speed of the motor will correspond to the frequency of movement of the piston 62 (see FIG. 4)

As can be appreciated by the skilled artisan having the benefit of this disclosure, other implementations of hydraulic control valves, mechanical operators, and generators are possible and are within the scope of the appended claims.

Elements of the embodiments have been introduced with either the articles "a" or "an." The articles are intended to mean that there are one or more of the elements. The terms "including" and "having" are intended to be inclusive such that there may be additional elements other than the elements listed. The term "or" when used with a list of at least two elements is intended to mean any element or combination of elements. In the specification and appended claims: the terms "connect", "connection", "connected", "in connection with", "connecting", "couple", "coupled", "coupled with", and "coupling" are used to mean "in direct connection with" or "in connection with via another element"; and the term "set" is used to mean "one element" or "more than one element".

While the present invention has been described with respect to a limited number of embodiments, those skilled in the art, having the benefit of this disclosure, will appreciate numerous modifications and variations there from. It is intended that the appended claims cover all such modifications and variations as fall within the true spirit and scope of this present invention.

What is claimed is:

1. An apparatus usable with a well, comprising:
an operator disposed in the well and configured to respond to a differential pressure between hydraulically isolated zones of the well to produce mechanical motion;
a generator disposed in the well and configured to convert the mechanical motion into electricity;
a piston;
at least one valve coupled to the piston; and
a housing translatable containing the piston, in which the piston defines a first chamber on one side of the piston and a second chamber on another side of the piston, wherein:
the mechanical motion is produced by said at least one valve alternately controlling application of the differential pressure across the piston, resulting in movement of the piston;
the hydraulically isolated zones comprise a first zone and a second zone;
the at least one valve is adapted to alternate facilitation of communication between the first and second zones and the first and second chambers; and
wherein the at least one valve comprises a first pair of valves coupled to the first chamber and respectively coupled to the first and second zones and a second pair of valves coupled to the second chamber and respectively coupled to the first and second zones.

2. The apparatus of claim 1, further comprising:
energy storage disposed downhole and configured to provide power to operate said at least one valve.

3. The apparatus of claim 1, wherein said at least one valve comprises:
a manifold having openings in communication with the first and second chambers and the first and second zones; and
a distributor configured to rotate the manifold to alternate communication of pressures between a first state in which the first chamber is coupled to one of the first or second zones and the second chamber is coupled to another of the first or second zones, and a second state in which the first chamber is coupled to the other of the first or second zones and the second chamber is coupled to the one of the first or second zones.

4. The apparatus of claim 1, the apparatus further comprising:
a packer; and
wherein the hydraulically isolated zones are hydraulically isolated by the packer.

5. The apparatus of claim 1, the apparatus further comprising:
a string comprising the operator and the generator; and
wherein the hydraulically isolated zones comprise a first zone outside the string and a second zone inside the string.

6. The apparatus of claim 1, further comprising:
a controller disposed downhole to regulate the generation of the electricity.

7. The apparatus of claim 1, further comprising:
energy storage to store energy in response to receiving the generated electricity.

8. The apparatus of claim 1, further comprising:
a tool disposed downhole in the well to receive power derived from the conversion of the mechanical motion into electricity.

9. The apparatus of claim 8, wherein the tool comprises at least one of the following:
a valve, a sensor and a telemetry module.

10. The apparatus of claim 8, wherein the tool comprises at least one of the following:
a valve, a sensor and a telemetry module.

11. The apparatus of claim 1; the apparatus further comprising:
a packer; and
wherein the hydraulically isolated zones are hydraulically isolated by the packer.

12. The apparatus of claim 1, the apparatus further comprising:
a string comprising the operator and the generator; and
wherein the hydraulically isolated zones comprise a first zone outside the string and a second zone inside the string.

13. The apparatus of claim 1, further comprising:
a controller disposed downhole to regulate the generation of the electricity.

14. The apparatus of claim 1, further comprising:
energy storage to store energy in response to receiving the generated electricity.

15. The apparatus of claim 1, further comprising:
a tool disposed downhole in the well to receive power derived from the conversion of the mechanical motion into electricity.

16. An apparatus usable with a well, comprising:
an operator disposed in the well and configured to respond to a differential pressure between hydraulically isolated zones of the well to produce mechanical motion;
a generator disposed in the well and configured to convert the mechanical motion into electricity;
a piston;
at least one valve coupled to the piston; and
a housing translatably containing the piston, in which the piston defines a first chamber on one side of the piston and a second chamber on another side of the piston, wherein:
the mechanical motion is produced by said at least one valve alternately controlling application of the differential pressure across the piston, resulting in movement of the piston;
the hydraulically isolated zones comprise a first zone and a second zone;
the at least one valve is adapted to alternate facilitation of communication between the first and second zones and the first and second chambers;
the at least one valve comprise a four way, two position valve, coupled to the first and second chambers and the first and second zones; and
wherein a first position of the four way, two position valve couples the first chamber to one of the first or second zones, and the second chamber to another of the first or second zones, and a second position of the four way, two position valve couples the first chamber to the other of the first or second zones and the second chamber to the one of the first or second zones.

17. The apparatus of claim 16, further comprising:
energy storage disposed downhole and configured to provide power to operate said at least one valve.

18. The apparatus of claim 16, wherein said at least one valve comprises:
a manifold having openings in communication with the first and second chambers and the first and second zones; and a distributor configured to rotate the manifold to alternate communication of pressures between a first state in which the first chamber is coupled to one of the first or second zones and the second chamber is coupled to another of the first or second zones, and a second state in which the first chamber is coupled to the other of the first or second zones and the second chamber is coupled to the one of the first or second zones.

* * * * *